United States Patent [19]

Gindi

[11] 3,710,358

[45] Jan. 9, 1973

[54] DATA STORAGE SYSTEM HAVING SKEW COMPENSATION

[75] Inventor: Abraham M. Gindi, San Jose, Calif.

[73] Assignee: International Business Machines Corporation, Armonk, N.Y.

[22] Filed: Dec. 28, 1970

[21] Appl. No.: 101,868

[52] U.S. Cl. ....................340/174.1 B, 340/174.1 G, 340/174.1 H

[51] Int. Cl. ....................G11b 5/02

[58] Field of Search .....340/172.5, 174.1 A, 174.1 B, 340/174.1 C, 174.1 G, 174.1 H

[56] References Cited

UNITED STATES PATENTS

| | | | |
|---|---|---|---|
| 3,103,000 | 9/1963 | Newman et al. | 340/174.1 B |
| 3,287,714 | 11/1966 | Dustin | 340/174.1 B |
| 3,299,410 | 1/1967 | Evans | 340/172.5 |
| 3,325,796 | 6/1967 | Otto et al. | 340/174.1 G |

*Primary Examiner*—J. Russell Goudeau
*Attorney*—Fraser & Bogucki

[57] ABSTRACT

A data recording system is disclosed in which skew occurring between parallel data tracks is compensated for by an arrangement which measures the skew during a given field and adjusts the size of the immediately following gap by one half the measured skew. The disclosed system comprises a magnetic disk file of the fixed head type in which opposite pairs of magnetic heads are alternatively employed to transfer data to and from a logical track comprising one half the circumference of each of a pair of circular tracks on a magnetic disk. The skew of each field within a logical track is measured and one half the measured value is, depending on the type of system used, added to or subtracted from the nominal size of a gap between the previous field and the immediately following field. Skew compensation is implemented by a circuit which counts bit ring cycles between occurrence of the early track and the late track, divides the resulting count by two and stores the quotient until the end of the field, and adds the stored bits to constants for the gap before turning on a write driver to update the following field in the case of a write operation or before locking a variable frequency oscillator to the data to be read in the case of a read operation.

14 Claims, 5 Drawing Figures

INVENTOR.
ABRAHAM M. GINDI
BY
Limbach and Limbach
ATTORNEYS

INVENTOR.
ABRAHAM M. GINDI

BY
Fraser and Bogucki
ATTORNEYS

INVENTOR.
ABRAHAM M. GINDI
BY
Fraser and Bogucki
ATTORNEYS

INVENTOR.
ABRAHAM M. GINDI
BY
Fraser and Bogucki
ATTORNEYS

INVENTOR.
ABRAHAM M. GINDI

BY
Fraser and Bogucki
ATTORNEYS

DATA STORAGE SYSTEM HAVING SKEW COMPENSATION

BACKGROUND OF THE INVENTION

1. Field of the Invention

The present invention relates to deskewing systems, and more particularly to plurality systems for use in magnetic recording arrangements in which data is simultaneously written on or read from a plurality of parallel tracks.

2. History of the Prior Art

Many different types of recording systems are known in which two or more parallel tracks are simultaneously addressed by an equivalent number of transducers. In the field of magnetic recording, for example, it is known to simultaneously address plural magnetic tracks on a disk, drum, tape, strip and the like. In such arrangements skew may occur due to a number of factors, one of the most common of which arises from relative lateral displacement of the magnetic transducers or heads. Where skew occurs it must frequently be corrected for such as by repositioning one or more of the heads relative to the magnetic medium or by displacing in time the data to be read or recorded in one or more of the tracks relative to a time base.

In a magnetic tape recording system in which parallel recording is employed, dynamic skew can result from distortion of the tape as it passes by the stationary heads. In a disk storage system, on the other hand, static skew may be encountered when a record is written in parallel on a disk pack by the magnetic heads of one disk drive and subsequently read back by another disk drive. In disk storage systems of the movable head type, the transducing heads are typically supported by long, flexible arms of relatively light weight material to facilitate the rapid acceleration and deceleration necessary when moving from track to track. A slight lateral vibration of the heads when writing or reading results in dynamic skew which occurs between different revolutions of the disk. If the vibration frequency is high enough the skew can vary from start to finish of a single record.

BRIEF SUMMARY OF THE INVENTION

The present invention provides skew correction in a parallel recording system in which the skew present during reading of a record is measured and the nominal length of a gap immediately following the record is changed by an amount equal to one half the measured skew. One half of the measured skew may either be added to or subtracted from the nominal gap length depending on the type of system used. Thus where the skew resides between a pair of parallel tracks which appear to be early and late relative to the associated heads, the read-out timing of the deskewing system may be locked to the early track or to the late track as desired. If early track lock-in is used, the reading of each set of parallel data is executed after a fixed time delay from the occurrence of the corresponding data of the early track. When skew exists, each bit of data on the early track appears earlier than it would in a no skew condition, thereby ending the reading of the record earlier. The addition of one half the skew brings the timing back to normal. Similarly, if a deskewing system is used in which the read-out is determined by the timing of the latest track, the reading of each record would be later with skew present than in a no skew condition, thereby ending each record later than normal. In this instance subtracting one half the skew returns the timing to normal.

In one preferred arrangement of a deskewing system according to the invention which is described in detail hereafter in connection with a fixed head magnetic disk file, deskewing is accomplished by adding one half the skew measured at the beginning of each field of a record to the nominal length of an intra or inter record gap separating the field from the immediately following field. The record comprises one of many such records of variable length, each of which is recorded simultaneously by one or the other of different pairs of magnetic heads along a logical track comprising one half the circumference of each of two different parallel tracks on a magnetic disk. Each record includes count and data fields which are separated by an intra record gap having deskew and skew intervals of appropriate length at the beginning and end thereof. The data field is separated from the count field of the following record by an inter record gap having deskew and skew intervals at the beginning and end thereof. In the event skew is present between the two different magnetic tracks, a skew counter is conditioned to count bit ring cycles between the first occurrence of the early track and the first occurrence of the late track, the counted bit ring cycles being stored and thereafter transferred to a micro processor where the lowest order bit is dropped and the remainder segregated as representing one half the actual skew. Measurement of skew takes place at the beginning of each field. At the end of the deskew interval within the early track, an intra or inter record gap of nominal length is initiated by commencement of a nominal count provided by a variable frequency oscillator or VFO locked to the disk speed. The count as provided by the VFO is compared with the nominal count as altered by the micro processor to compensate for skew, the micro processor adding one half the actual skew to the nominal count for the particular gap in question. When the actual gap length equals that determined by the micro processor, the following field is commenced by turning on a write driver in the case of a write operation or by locking the VFO to the data in the event of a read operation.

BRIEF DESCRIPTION OF THE DRAWINGS

The novel features of this invention, as well as the invention itself, both as to its organization and method of operation, may best be understood from a reading of the following description, taken in conjunction with the accompanying drawings, in which.

DETAILED DESCRIPTION

Figure 1:
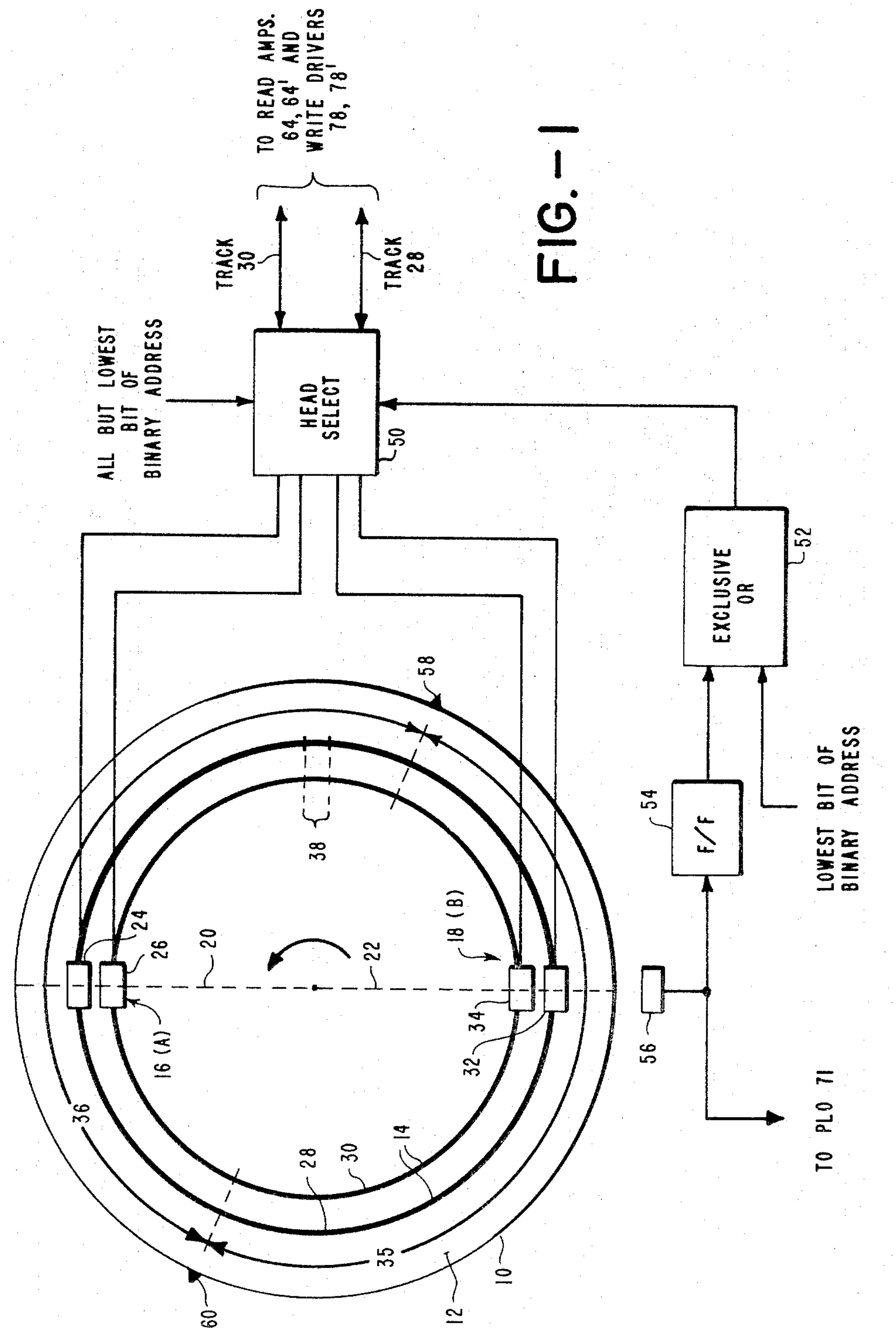
FIG. 1 is a partial schematic diagram and partial block diagram of a portion of one preferred arrangement of a magnetic disk file employing skew compensation in accordance with the present invention.
Figure 2:
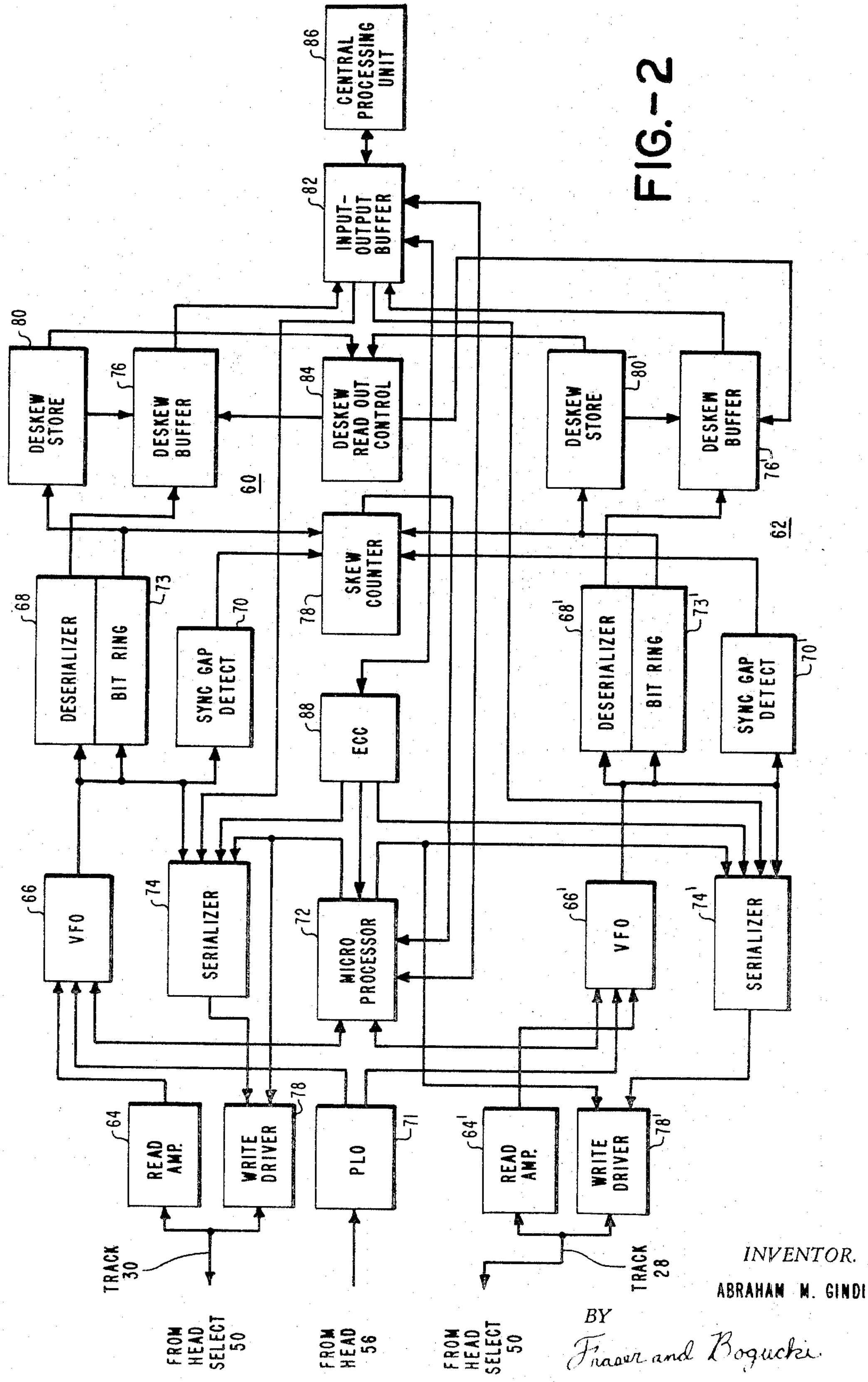
FIG. 2 is a block diagram of the remaining portion of the arrangement of FIG. 1.

A preferred arrangement of a magnetic disk file having skew compensation in accordance with the invention is illustrated in FIGS. 1 and 2. It should be understood however that skew compensation in accordance with the invention is useful in other parallel recording systems, both magnetic and nonmagnetic, and that the particular arrangement of FIGS. 1 and 2 is shown and hereafter described in detail for purposes of example only.

The disk file is shown in FIG. 1 as including a rotatable disk 10 having a magnetizable surface 12 which includes 2 plurality of endless circular tracks 14, only two of which are shown for simplicity of illustration. Mounted adjacent opposite sides of the magnetic disk 10 and 180° removed from one another relative to the disk 10 are opposite groups 16 and 18 of magnetic transducing heads. The magnetic heads in the group 16 are disposed along a common radius 20 of the disk 10 with each head being associated with a different one of the magnetic tracks 14. Similarly, the magnetic heads in the group 18 are disposed along a common radius 22 of the magnetic disk 10 with each being associated with a different track 14. Each of the groups of magnetic heads 16 and 18 is shown as comprising only two heads for simplicity of illustration while in actual practice each group typically comprises many such heads. Thus, the group 16 is shown to comprise magnetic heads 24 and 26 respectively associated with magnetic tracks 28 and 30 and hereafter conveniently referred to as the "A" pair of heads, while the group 18 is shown to comprise heads 32 and 34 respectively associated with the tracks 28 and 30 and hereafter conveniently referred to as the "B" pair of heads. The groups of magnetic heads 16 and 18 are mounted by any appropriate arrangement (not shown in FIG. 1) so as to dispose each head adjacent a desired magnetic track 14 at an appropriate distance from and in a manner such that magnetic transducing can take place during read and write operations.

In the particular recording scheme used in the embodiment of FIG. 1, a logical track comprises one half of each of an adjacent pair of the magnetic tracks 14. Thus, as shown in FIG. 1, the magnetic tracks 28 and 30 define two different logical tracks 35 and 36. The length of each logical track is divided into a plurality of different records of variable length. Recording of a given field or record occurs simultaneously on both magnetic tracks 28 and 30 such that each record, as shown for example by a record 38 near the end of the logical track 36 extends along a portion of the length of the associated logical track.

The advantages of having opposite groups 16 and 18 of magnetic transducing heads will be appreciated in terms of minimization of access time to reach a desired record. Thus, in the case of the record 38, the "A" heads 24 and 26 can be used to effect a given operation since they are the heads which will be first encountered by the record 38 when in the position shown in FIG. 1. In the event the record 38 had already passed the "A" heads the "B" heads 32 and 34 could instead be used, thus saving the time required for a half revolution of the magnetic disk 10 from the location of the "B" heads to that of the " " heads. Thus if the disk 10 rotates at a speed of 6000 rpm a time saving of up to 5 milliseconds can be realized by use of the two head group system shown as opposed to a disk file having a single group of heads.

The selection of the "A" or "B" heads for most efficient addressing of a given record or records is accomplished by head select circuitry 50 under the control of an Exclusive OR circuit 52 and associated flip flop 54. The input of the flip flop 54 is coupled to a magnetic head 56 so as to change the state of the flip flop 54 and condition one of the inputs of the Exclusive OR circuit 52 whenever the head 56 senses one of a pair of index pins 58 and 60 disposed at opposite sides of the disk 10 to indicate the orientation of the magnetic disk 10 relative to the head 56 and the "A" and "B" heads. The other input of the Exclusive OR circuit 52 is conditioned by the lowest bit of a binary address which designates that half of the disk 10 in which the addressed record is located. The Exclusive OR circuit 52 responds to the output of the flip flop 54 representing the orientation of the disk 10 and to the lowest address bit representing the desired half of the disk 10 to provide to the head select circuitry 50 a signal which facilitates selection of an appropriate pair of heads. The selection is also based on the remainder of the binary address which is applied directly to the head select circuitry 50. Any appropriate circuit known in the art can be used as the head select circuitry 50.

During manufacture of the magnetic disk file, care is taken to mount the magnetic heads 24, 26, 32 and 34 so that they coincide exactly with the radii 20 and 22. As a practical matter, however, the two heads 24 and 26 comprising the "A" heads may lie along an axis which is inclined slightly relative to the radius 20 while the "B" heads 32 and 34 may lie along an axis which is also inclined slightly relative to the radius 22 and which in all probability is oriented differently than that of the "A" heads. If only a single pair of heads, either the "A" heads or the "B" heads, were used to perform all read and write operations on the magnetic tracks 28 and 30, then the radial alignment of the heads or absence of it would be unimportant. However, since two different pairs of heads are used for the same tracks, a skewing effect results.

In accordance with the present invention as hereafter described in greater detail, the skew which takes place as a result of different alignments of the different groups of heads is compensated for by measuring the skew which is present when a given pair of heads is being used and by thereafter adding one half the measured skew to an immediately following gap within the particular record being addressed for purposes of subsequent writing or reading operations by the same pair of heads. This technique assumes that the skew is always within given limits which can be defined. In the present example maximum possible skew is assumed to be 6 bytes. As described in greater detail hereafter in connection with FIG. 3, each record such as the record 38 shown in FIG. 1 is comprised of count and data fields which are separated by an intra record gap. However this is a simplification for purposes of illustration since in actual practice a key field and associated intra record gap are usually disposed between each count field and associated data field. The record itself is separated from the immediately following record by an inter record gap. Both intra and inter record gaps include a deskew interval of fixed length and a skew uncertainty interval of fixed length. In accordance with the invention, skew is measured during each count and data field and the length of the following intra or inter record gap is varied relative to a nominal predetermined length by the addition of one half the measured skew prior to initiating reading or writing of the following field. Writing is initiated by turning on a write driver, while reading is initiated by locking a VFO to the read data. In the absence of skew correction as provided according to the invention, an additional skew uncertainty interval would have to be included in each gap.

FIG. 2 shows the circuitry in two different channels 60 and 62 employed to simultaneously read or write in the two different tracks comprising each logical track, in the present example tracks 28 and 30. FIG. 2 also shows the associated circuitry which is common to both channels 60 and 62. The channels are identical in their arrangement and interconnection, and accordingly only channel 60 will hereafter be described. Moreover like components in the channel 62 corresponding to those in channel 60 are designated by the same reference numerals but with the addition of a prime.

The head select circuitry 50 shown in FIG. 1 is coupled through a read amplifier 64 which provides amplification during a reading operation to a variable frequency oscillator or VFO 66. The VFO 66 operates at a frequency determined by the signal input thereto, and compensates for a number of factors including speed variations in the magnetic disk 10 and bit shift in the data being read. The VFO 66 is either locked to the data at the output of the read amplifier 64, in which event the data is effectively passed to a deserializer 68 and to a sync gap detect circuit 70, or alternatively is locked to a phase locked oscillator or PLO reference 71 coupled to the magnetic head 56 so as to be related to the speed of rotation of the magnetic disk 10, in which event the data at the output of the read amplifier 64 is effectively uncoupled from the VFO 66. The locking of the VFO 66 to the data or to PLO 71 is controlled by a micro processor 72 which controls most of the functions within the arrangement of FIG. 2 including skew measurement and gap length variation as described hereafter. The VFO 66 is normally relatively slow to react, having a relatively large time constant, but responds in relatively rapid fashion to lock-in the read data when the micro processor 72 so commands.

Data passed by the VFO 66 is applied to the deserializer 68 where the various bits thereof are formed into 8 bit bytes under the control of an associated bit ring 73. The bit ring 73 responds to a clock output from the VFO 66 as does the sync gap detect 70 and a serializer 74. The position of the bit ring 73 determines the various latches of the register comprising the deserializer 68 into which the various data bits are sent. The data as formed into 8 bit bytes is then passed to a deskew buffer 76.

The sync gap detect 70 responds to both the data and the clocking output from the VFO 66, counting circuitry within the sync gap detect 70 being advanced by each clock bit and reset by each data bit. The sync gap detect 70 is not however reset by gaps which are present in the data so as to detect and communicate the occurrence of each such gap to a skew counter 78 and to the bit ring 73 so as to synchronize the bit ring 72 to the data. The sync gap detect 70 also responds to a 3 byte address marker discussed hereafter. As described hereafter the skew counter 78 is operative to begin counting cycles of the bit ring 73 or 73' upon the occurrence of a sync gap as detected by the detect circuit 70 or 70' from the early track when the tracks 28 and 30 are skewed relative to one another as seen by the magnetic heads. The counter 78 continues to count bit ring cycles until stopped by the occurrence of a sync gap within the late track as sensed by the detect circuit 70 or 70'. The micro processor 72 then receives the count from the counter 78 and proceeds to drop the lowest order bit of the count so as to effectively divide the count value or measured skew by two. The resulting value representing one half the measured skew is then stored by the micro processor 72 for subsequent use in increasing the nominal length of the immediately following intra or inter record gap by locking the VFOs 66 and 66' to the incoming data in the case of a read operation or by turning on write drivers 78 and 78' in the case of a write operation. The write drivers 78 and 78' couple the serializers 74 and 74' to the head select circuitry 50.

The bit ring cycles from the bit ring 73 in addition to stepping the skew counter 78 are also operative to advance a counter comprising a deskew store 80. The deskew store 80 in turn controls the entry of the bytes as formed by the deserializer 68 into the deskew buffer 76. The deskew buffers 76 and 76' comprise registers the lengths of which are determined in part by the maximum possible skew. In the present example where maximum skew is determined to be 6 bytes, the buffers 76 and 76' are conveniently chosen so as to be 8 bytes in length. Where the maximum possible skew of 6 bytes is present one of the buffers 76 and 76' will store 6 bytes before the other buffer begins storing bytes. The circuit may be conveniently arranged so that both buffers 76 and 76' begin reading data to an input-output buffer 82 whenever one of the buffers 76 and 76' contains 7 bytes. This is accomplished by a deskew readout control 84 which reads out of both deskew buffers 76 and 76' 6 bytes behind the earliest deskew store 80, 80'.

The input-output buffer 82 conveniently comprises a register 2 bytes in width which is operative to transfer data between the channels 60 an 62 and a central processing unit 86 which may comprise a central computer or other appropriate data processing device for transmitting data and addressing information to and from the magnetic disk file.

During a write operation data from the central processing unit 86 is passed by the input-output buffer 82 directly to the serializers 74 and 74' where the 8 bits comprising each byte are serially arranged and passed via the write drivers 78 and 78' to the head select circuitry 50 for recording on the magnetic disk 10. An error correction code or ECC circuit 88 responds to selected bytes of the data which is temporarily stored in the input-output buffer 82 to generate a representative code of 16 bytes which are recorded at the end of each field, 8 bytes on each track. When the filed is read the same code is generated again and the recorded code is compared to the generated code. Any difference between the two codes indicates an error occurred in writing or reading the field. If the error length is within the specified limits of the ECC capability, the difference between the two codes is used to correct the error.

Figure 3:
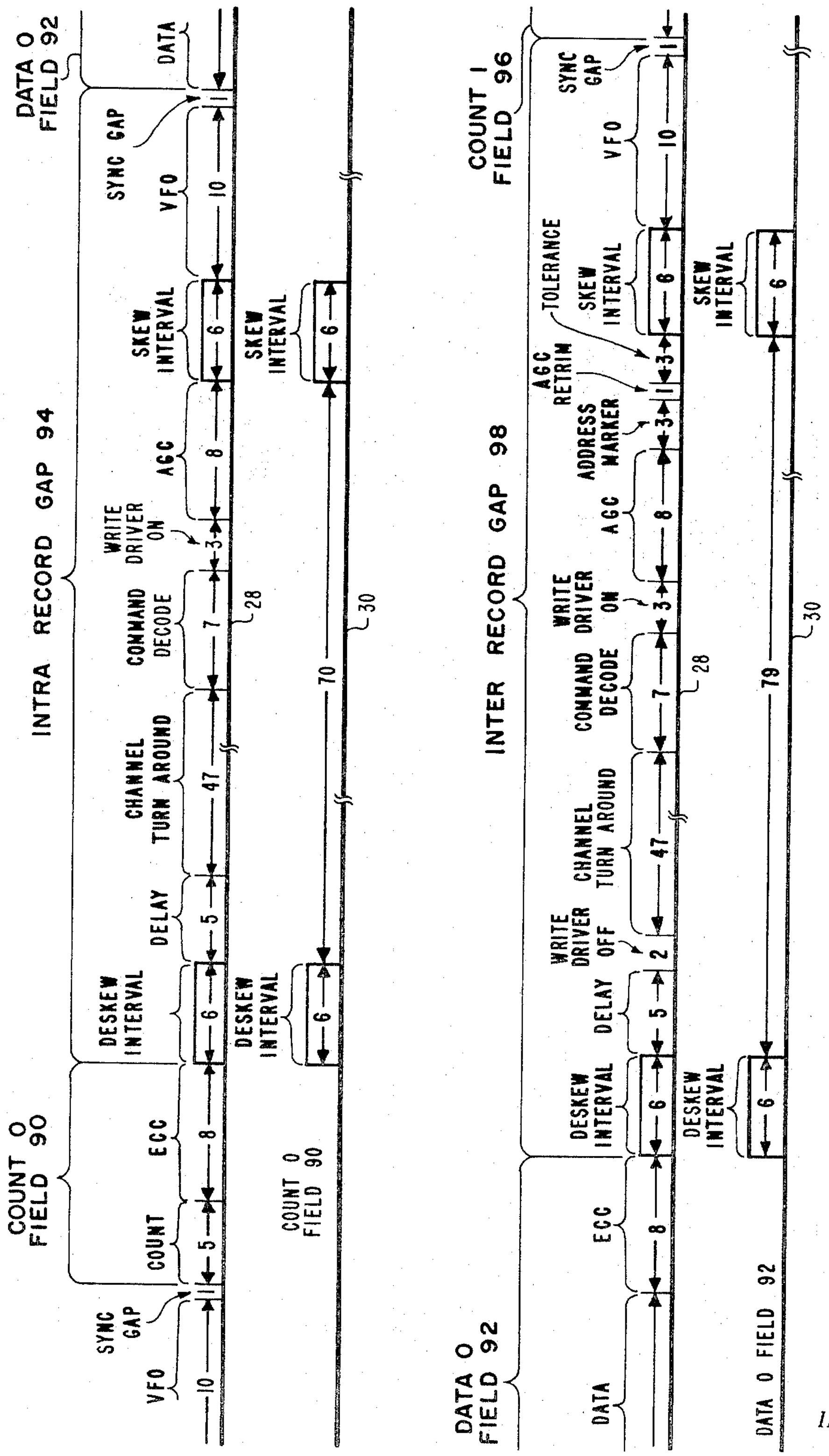
FIG. 3 is a diagrammatic plot illustrating a typical record as recorded on one of the logical tracks of the magnetic disk in the FIG. 1 arrangement.

The diagrammatic illustration of FIG. 3 represents a typical record and could, for example, comprise the record 38 on the disk 10 of FIG. 1. As previously noted, each record for purposes of the present example comprises count and data fields separated by an intra record gap with the records themselves being separated by an inter record gap. In the example illustrated in FIG. 3, the count field is conveniently designated to count 0 field 90 and the data field is conveniently designated to data 0 field 92. The count and data fields 90 and 92 are separated by an intra record gap 94, and the end of the record as represented by the end of the data 0 field 92 is separated from the beginning of the immediately following field as represented by a count 1 field 96 by an inter record gap 98.

A 10 byte VFO interval and a sync gap 1 During byte in length occur at the end of the inter record gap immediately preceding the count 0 field 90. during the 10 byte VFO interval the VFOs 66 and 66' are being locked to the data in preparation for reading the count 0 field 90. The occurrence of the 1 byte sync gap causes the bit rings 73 and 73' to synchronize to the data and the sync gap detect circuits 70 and 70' to respond in the manner previously described in connection with FIG. 2. Thus if the tracks 28 and 30 are skewed such that track 28 is the early track and track 30 is the late track, the occurrence of the sync gap in the track 28 is sensed by the sync gap detect 70' to start the skew counter 78. Thereafter the occurrence of the sync gap in the late track 30 is sensed by the sync gap detect 70 to stop the skew counter 78. During the immediately following 5 byte count interval which begins the count 0 field 90 the count value is transferred from the counter 78 to the micro processor 72 where one half the value of the skew is computed and stored. The 5 byte count interval is followed by an 8 byte error correction code or ECC interval during which time recorded bytes which are read from the record and temporarily stored in the input-output buffer 82 are compared by the ECC circuit 88 to the generated code to determine if errors are present as described earlier.

The intra record gap 94 is commenced by a deskew interval which is 6 bytes in length to allow for the maximum possible skew of 6 bytes. The 6 byte deskew intervals insure that the following 5 byte delay interval will not occur in the early track before the end of the 8 byte ECC interval in the late track. The micro processor 72 which determines the length of the gaps such as the intra record gap 94 and the inter record gap 98 senses when the end of the 6 byte deskew interval of the early track occurs and determines the length of the gap by performing a count equal to the nominal size of the gap plus one half the measured skew between the end of the 6 byte deskew interval in the early track and the initiation of a 6 byte skew interval in both tracks near the end of the gap. In the example shown in FIG. 3 no skew is present and the micro processor 72 accordingly provides for a count equal to the nominal size of the intra record gap equal to 70 bytes between the end of the 6 byte deskew intervals and the start of the following 6 byte skew intervals. As described hereafter, in the presence of skew the micro processor 72 adds one half the measured skew or as much as 3 bytes to the nominal 70 byte count when counting between the end of the 6 byte deskew interval in the early track and the point at which the following 6 byte skew intervals in both tracks are to commence so as to compensate for the skew.

The 5 byte delay interval following the 6 byte deskew interval allows the last of the error correction code bytes to circulate through the system from the deskew buffers 76 and 76' to determine if error is present. If no error is present a signal is provided to the central processing unit 86 indicating that channel turn around may begin. Channel turn around takes place during the following 47 byte interval. During the channel turn around interval the central processing unit 86 determines the operation which is to be performed in the next field. At the end of the channel turn around interval the central processing unit 86 provides to the micro processor 72 via the input-output buffer 82 a signal indicating the operation which is to take place in the following field, and this signal is decoded by the micro processor 72 during an immediately following 7 byte command decode interval. If the micro processor 72 has determined that a write operation is to take place in the immediately following field, then the write drivers 78 and 78' are turned on during an immediately following 3 byte interval. On the other hand if a read operation is to take place the VFOs 66 and 66' are locked to the data during the 6 byte skew interval which immediately follows an 8 byte automatic gain control or AGC interval. During the AGC interval the gain of the read amplifiers 64 and 64' is adjusted as necessary to compensate for differences in amplitude between the previous and following fields. Such differences can arise, for example, when one pair of heads is used to read two adjacent fields, each of which was written by a different pair of heads. During the AGC interval the gain of the read amplifiers 64 and 66' is adjusted as necessary prior to locking the VFOs 66 and 66' to the data during the 6 byte skew intervals. The locking of the VFOs 66 and 66' to the data is normally commenced at the center of the 6 byte skew intervals but can be commenced at the beginning or end of a given skew interval when skew is present. In any event locking of the VFOs to the data must be accomplished before the end of the immediately following 10 byte VFO interval. The 1 byte sync gaps at the end of the intra record gap 94 function in similar fashion to the sync gaps at the beginning of the count 0 field 90 to synchronize the bit rings 73 and 73' and to indicate the skew present if any at the beginning of the data 0 field 92.

During the data 0 field 92 data is either read from or written on the tracks during a data interval of variable length which is followed by an 8 byte ECC interval during which the generated code is written or compared to the read code by the ECC circuit 88 to detect and correct errors.

The 6 byte deskew intervals at the beginning of the inter record gap 98 function in the same manner as do the 6 byte deskew intervals at the beginning of the intra record gap 94 to allow for the presence of skew and to define the point at which the count of the inter record gap 98 is to begin. The gap 98 is nominally 79 bytes in length between the deskew and following skew intervals as shown. If skew is present, however, one half the value of the skew as measured in response to the sync gaps at the end of the intra record gap 94 is added to the nominal 79 byte value and the count of this sum is begun at the end of the 6 byte deskew interval in the early track. At the end of the count the 6 byte skew intervals are simultaneously written.

During the following 5 byte delay interval the ECC bytes circulate through the system on a read operation and the presence of any error is determined. During a following 2 byte interval which occurs in the inter record gap 98 but not in the intra record gap 94 the write drivers 78 and 78' are turned off to terminate a write operation. The write drivers cannot be turned off any earlier than this since during a read operation the late track may still be reading data during part of the deskew interval of the early track. Since it is not known when the early track is finished, reading may continue through the deskew and delay intervals. If the write driver had been turned off in this interval, it would leave transients that would disturb the VFO when reading. At the end of the delay interval in a read operation the VFOs 66 and 66' are unlocked from the data and locked instead to the PLO reference 71. In a write operation the VFOs 66 and 66' are constantly locked to the PLO reference 71.

Thereafter the central processing unit 86 determines the next operation during a 47 byte channel turn around interval, the resulting command from the central processing unit 88 is decoded by the micro processor 72 during a 7 byte command decode interval, the write drivers 78 and 78' are turned on during a 3 byte interval where the next operation is determined to be a write operation, and the automatic gain controls of the read amplifiers 64 and 64' are adjusted during a following 8 byte AGC interval where a read operation is to take place.

The 3 byte address marker like the 1 byte sync gaps appears as a gap since it comprises recorded zeros rather than ones. It is sensed by the sync gap detect circuits 70 and 70' to alert the micro processor 72 that the next field is a count field. During the 3 byte address marker the read amplifiers 64 and 64' are not receiving data bits or ones and the automatic gain controls thereof respond by increasing the gain. A 1 byte AGC retrim interval is therefore provided following the address marker to allow for readjustment of the AGC. During a following 3 byte tolerance interval compensation is provided for part of the apparatus used to drive the magnetic disk 10. Thereafter the 6 byte skew intervals occur followed by a 10 byte VFO interval to compensate for the skew and to allow for locking of the VFOs 66 and 66' to the data in the case of a read operation. Thereafter sync gaps are detected to enable measurement of any skew present and to synchronize the bit rings 73 and 73' to the data, and operation of the system continues with respect to the following record in the same fashion as described in connection with FIG. 3.

FIGS. 4A through 4H show the record of FIG. 3 in simplified fashion and depict different examples of reading or writing operations which may occur so as to cause skew problems and the manner in which such skew is compensated for so as to alleviate such problems in accordance with the invention. Where skew occurs the maximum skew of 6 bytes is assumed to be present for purposes of example.

FIG. 4A depicts the situation in which the record is written and thereafter read using the "B" magnetic heads. Since the same heads are used to both write and read the record in the example of FIG. 4A, no skew is present during reading and the record accordingly appears without skew as in the case of FIG. 3.

When writing a record the corresponding intervals of both tracks are written simultaneously, and no skew compensation is necessary. Accordingly the gap length between the deskew interval and the following skew interval is made equal to 70 bytes in the intra record gap 94 and 79 bytes in the inter record gap 98. When this record is read back by the same heads, no skew appears and skew compensation is accordingly not necessary. Since the skew of the upcoming field is unknown when reading each gap, it is necessary to initiate locking of the VFOs 66 and 66' to the data at a time that is at least 10 bytes prior to the sync gap but not before the skew interval. The nominal time from the end of the deskew interval to VFO to data locking is 73 bytes in the intra record gap 94 and 82 bytes in the inter record gap 98. When maximum skew of 6 bytes is present, the nominal interval lengths are increased to 76 bytes and 85 bytes respectively. Accordingly in FIG. 4A locking of the VFOs to the data will begin in the center of the skew intervals.

In the example of FIG. 4B the "A" heads are used to read the count 0 field 90, to write the data 0 field 92, and to thereafter read the entire record. Since the "A" heads are now being used to read and write rather than the "B" heads, a skew is present which is measured at the beginning of the reading of the count 0 field 90 and which thereafter appears in the form of a displacement of the deskew intervals at the beginnig of the intra record gap 94. In this example the maximum skew of 6 bytes is assumed to be present in which event the micro processor 72 stores a value equal to one half the skew or, 3 bytes and thereafter adds this value to the nominal gap size of 70 bytes to provide a count of 73 bytes which is commenced at the end of the deskew interval in the early track 30. At the end of the 73 byte count the skew intervals in both tracks occur simultaneously. Since the following data 0 field 92 is written by the "A" heads as well as read back by them no skew is present within the field 92 and the deskew intervals at the beginning of the inter record gap 98 are in alignment. However the following count 1 field 96 which was written by the "B" heads appears skewed to the "A" heads resulting in a displacement of the skew intervals at the end of the inter record gap 98.

When reading in the example of FIG. 4B using the "A" heads an interval of 76 bytes is allowed before locking the VFOs 66 and 66' to the data in the intra record gap 94. This again occurs at the middle of the skew intervals. In the inter record gap 98, however, no skew appears in the data 0 field 92 and the VFOs are locked to the data 82 bytes after termination of the deskew interval. This occurs at the beginning of the skew interval of the count 1 field 96 for the track 28 and at the end of the skew interval for the track 30, both cases being within the specified limits. It will also be observed that in the examples of FIGS. 4C–4H the specified limits are adhered to because of skew compensation.

In the example of FIG. 4C and "A" heads are used to read the data 0 field 92, to write the count 1 field 96, and to thereafter read the entire record. As in the example of FIG. 4B where the "A" heads were also used to read, the deskew intervals at the beginning of the intra record gap 94 are displaced while the skew intervals at the end of the gap 94 are in alignment. The data 0 field 92 which was written in the example of FIG. 4B using the "A" heads is read back without any skew using the "A" heads in FIG. 4C. Since the count 1 field 96 was written using the "A" heads the skew intervals at the end of the inter record gap 98 which immediately precede the count 1 field 96 are in alignment.

In the example of FIG. 4D the entire record of FIG. 4C is read using the "B" heads. Since the count 0 field 90 was originally written using the "B" heads, no skew is present and the deskew intervals at the beginning of the intra record gap 94 are in alignment. However the following data 0 field 92 was written using the "A" heads during the example of FIG. 4B, and the skew intervals at the end of the intra record gap 94 accordingly are displaced as shown in FIG. 4D. Similarly the deskew intervals at the beginning of the following inter record gap 98 are displaced as are the following skew intervals.

In the example of FIG. 4E the "B" heads are used to read the data 0 field 92, to write the count 1 field 96, and to thereafter read the entire record. As in the immediately above example of FIG. 4D the deskew intervals are in alignment while the following skew intervals at the end of the intra record gap 94 are displaced. Similarly the deskew intervals at the beginning of the inter record gap 98 are displaced. However since the "B" heads are used to write the count 1 field 96 the skew intervals at the end of the inter record gap 98 are in alignment.

In FIG. 4F the "A" heads are used to read back the record of FIG. 4E. The "B" heads were originally used to write the count 0 field 90, and accordingly the deskew intervals at the beginning of the intra record gap 94 are displaced from one another. However the "A" heads were last used to write the data 0 field 92 and the skew intervals at the end of the gap 94 are accordingly in alignment as are the following deskew intervals at the beginning of the inter record gap 98. The "B" heads were last used to write the count 1 field 96, however, and the skew intervals at the end of the gap 98 are accordingly displaced as shown.

FIG. 4G depicts an example in which the "B" heads are used to read the count 0 field 90, to write the data 0 field 92, and to thereafter read the entire record as so written. The "B" heads were last used to write the count 0 field 90 resulting in alignment of the deskew intervals at the beginning of the gap 94. Since the "B" heads are used to write the data 0 field 92, the skew intervals at the end of the gap 94 are in alignment as are the following deskew intervals at the beginning of the gap 98. The count 1 field 96 was last written using the "B" heads and the skew intervals at the end of the gap 98 also align with one another. It will be noted that all the deskew and skew intervals are at this time in the same relative positions they were in in the example of FIG. 4A.

In the final example of FIG. 4H the record of FIG. 4G is read using the "A" heads. As contrasted with FIG. 4G where use of the "B" heads resulted in alignment of each of the deskew and skew intervals, a reading of the same record using the "A" heads as shown in FIG. 4H results in displacement of each of the corresponding intervals with the track 30 being the early track and the track 28 being the late track. It will be noted that the locking of the VFOs 66 and 66' to the data will commence following the procedure described above at the beginning of each skew interval in the track 28 and at the end of each skew interval of track 30.

The advantages of skew compensation in accordance with the present invention can better be appreciated by considering the various operations of FIGS. 4A through H but without skew compensation. Such examples are depicted in FIGS. 5A through H.

Figure 5:
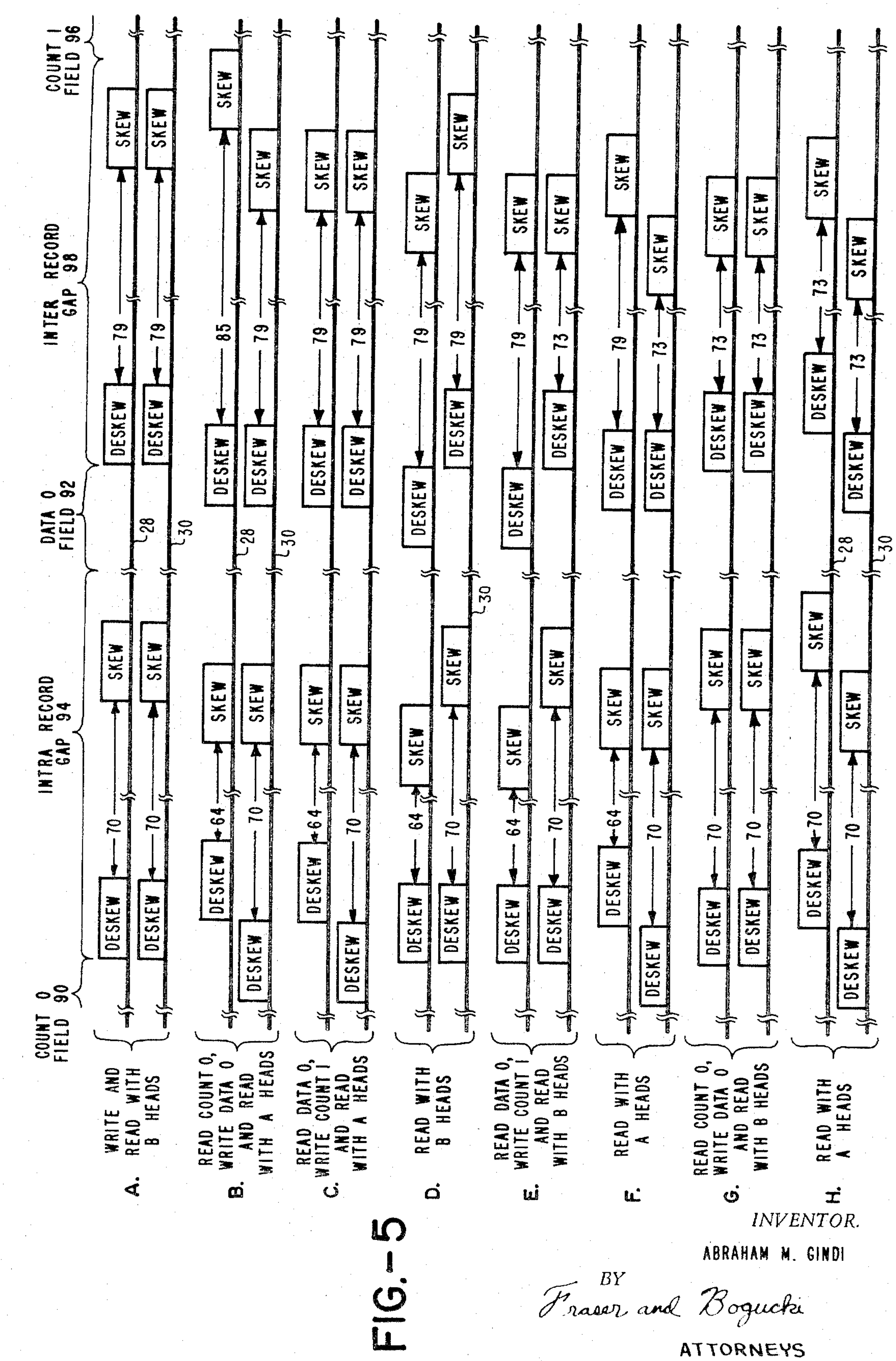
FIGS. 5A–5H are simplified diagrammatic plots corresponding to those of FIG. 4 but without skew compensation.

In FIG. 5A the record is both written and read back using the "B" heads and accordingly no skew occurs. In the technique shown in FIG. 5 the skew intervals at the end of the intra record gap 94 are located by counting 70 bytes from the end of the deskew interval in the early track. Similarly the skew intervals at the end of the inter record gap 98 are located by counting 79 bytes from the end of the deskew interval in the early track.

Thus in FIG. 5B where the count 0 field 90 is read, the data 0 field 92 is written, and the entire record is thereafter read using the "A" heads, the deskew intervals at the beginning of the gap 94 are displaced, but the skew intervals which follow the end of the deskew interval in the early track 30 by 70 bytes are in alignment since the following data 0 field 92 was written using the "A" heads. Similarly the deskew intervals at the beginning of the gap 98 are in alignment, but the skew intervals preceding the count 1 field 96 previously written with the "B" heads are displaced when read by the "A" heads. Since no skew compensation was used, the intra record gap 94 is shorter than the corresponding gap in the example of FIG. 4B by 3 bytes and the resulting inter record gap 98 is longer than the corresponding gap in FIG. 4B by 3 bytes. In the inter record gap 98 locking of the VFOs to the data must commence 85 bytes after termination of the deskew intervals.

In the example of FIG. 5C where the "A" heads are again used to read the record after writing the count 1 field 96 the various deskew and skew intervals assume the same orientation as in FIG. 5B with the exception of the skew intervals at the end of the gap 98 which are in alignment since the count 1 field 96 has been written with the "A" heads.

In the example of FIG. 5D where the "B" heads are used to read back the record of FIG. 5C a possible problem could be encountered during the intra record gap 94 where a count of at least 70 bytes between the deskew and skew intervals of the track 30 is required if the VFOs are to be locked to the data. However in the example as shown the necessary count is provided and therefore no problem arises.

The exercise continues following the same general rules and without any problems until the example of FIG. 5H is encountered. In that example a byte count of 76 is required between the end of the deskew interval in the early track 30 and the following skew interval. However since the standard 70 byte count is used, locking of the VFOs to the data must be initiated while the AGC interval of the late track 28 is still taking place. Accordingly, the VFO 66' is locked to unreliable data which is still undergoing an AGC adjustment.

It will be observed that the inter record gap 98 in FIG. 5 encounters the same problem. While the examples of FIGS. 5B and 5D require 85 bytes before locking of the VFOs, the examples of FIGS. 5F, 5G and 5H require no more than 79 bytes.

Figure 4:
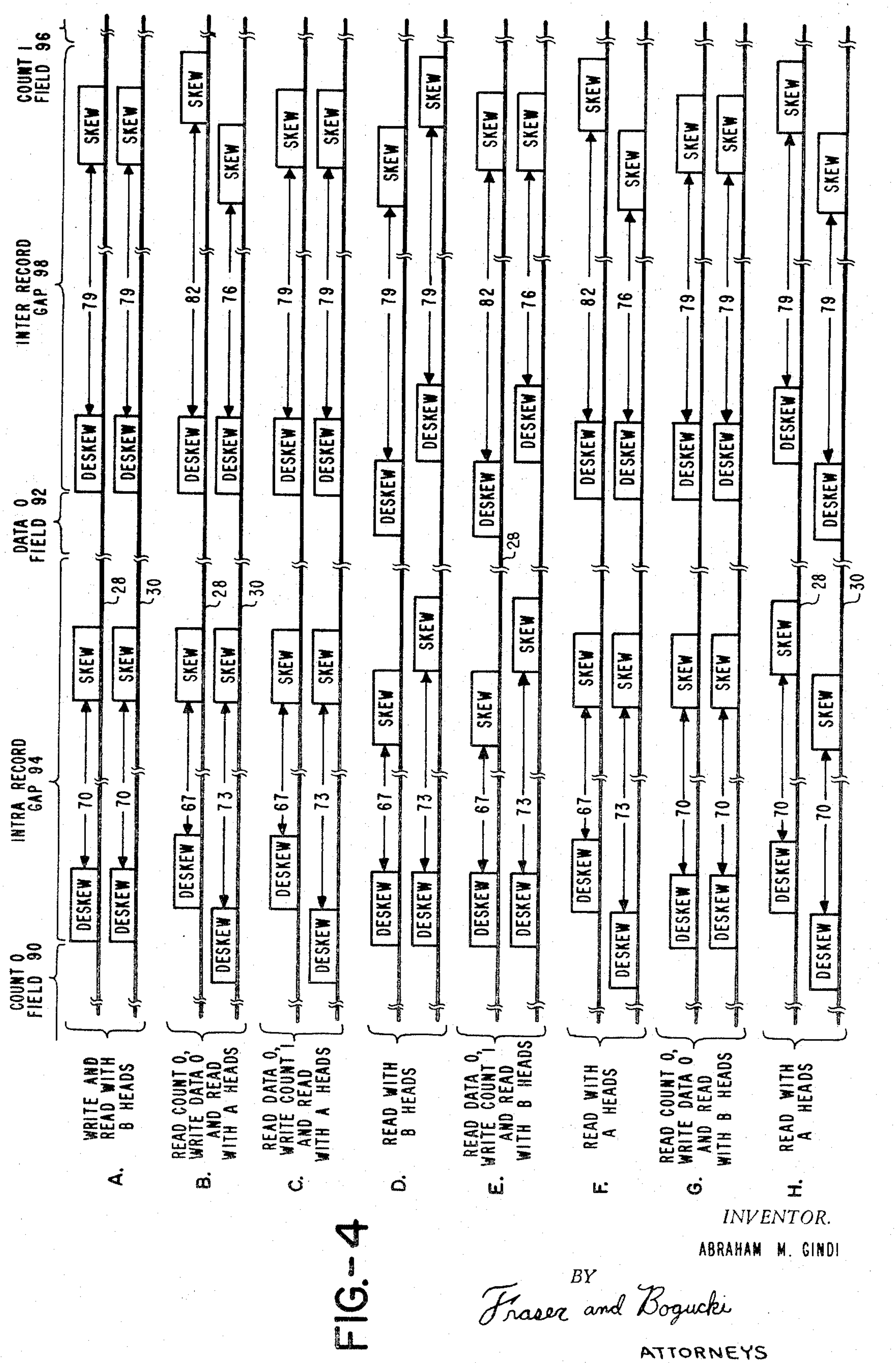
FIGS. 4A–4H are simplified diagrammatic plots of the record of FIG. 3 during various different read and write operations useful in illustrating the manner in which skew compensation is accomplished in accordance with the invention.

It will be seen that in comparison with the example of FIG. 5 the use of skew compensation in accordance with the invention as depicted in FIG. 4 provides for deskew and skew intervals within each of the gaps which always coincide with common axes. The intervals shown in the example of FIG. 5 do not, and would therefore require an increase in the length of each skew interval by 6 bytes. The present invention eliminates the need for this additional length of the skew interval and thereby conserves valuable track length which can otherwise be used to store data by compensating for the uncertainty of the skew of the previous field, which compensation comprises the addition of one half the skew as so measured to the following gap in the present example.

While skew compensation is described in connection with the previous example in terms of addition of one half the measured skew to the following gap, skew compensation can also take place in accordance with the invention, as previously noted, by subtracting one half of the measured skew from the following gap. The subtraction technique is used by concentrating on the late track rather than the early track. More specifically the late track is monitored after measurement of the skew and computation of one half the value thereof, and upon occurrence of the end of the deskew interval in the late track a count is begun to determine the distance to the following skew interval, which count comprises the nominal value minus one half the measured skew. One advantage of the late track or subtraction method of skew compensation over the early track or addition technique arises in the situation in which the ECC interval at the end of the count field is finished and it is determined that no skew is present. In that situation reading of the field is completed earlier and the following channel turn around interval can begin earlier and therefore provide more time in which to decode the next command. In the preferred embodiment of FIGS. 1 and 2, maximum skew conditions determined that the total gap intervals resulting from the early track and late track lock-in systems were the same. The early track lock-in system is preferred for some applications because of its convenience in design. However, for other applications involving different design restrictions, a late track lock-in system may be implemented to effect a further saving in the total gap overhead.

The example of the present invention previously described assumes that the skew is static as typically provided by head displacement such that the skew remains the same between the beginning and end of a given field. If the skew is in fact static skew, it can be measured at the beginning of a field and assumed to be the same without further measurement upon termination of the field and commencement of the following gap. The present invention is also applicable to dynamic skew such as may result from distortion of the magnetic record member or other member providing the tracks. In the case of dynamic skew, however, the skew must be measured at the end of a given field since a measurement of skew at the beginning of the field may not be valid at the end of the field. This can be done by subtracting the values in the deskew store counters 80 and 80' at the end of the field.

While the invention has been particularly shown and described with reference to a preferred embodiment thereof, it will be understood by those skilled in the art that various changes in the form and details thereof may be made therein without departing from the spirit and scope of the invention.

What is claimed is:

1. In an arrangement in which plural transducers simultaneously address different respective ones of a plurality of nominally parallel tracks on a record member which undergoes motion relative to the transducers to perform read or write operations with respect to a succession of recordings extending along the nominally parallel tracks and separated by gaps of nominal length, an arrangement for compensating for skew between the nominally parallel tracks as presented to the associated transducers, comprising:
   - means for sensing the skew present between the nominally parallel tracks within each of the recordings; and
   - means responsive to the skew sensing means for changing the nominal length of the following gap by an amount corresponding to one half the value of the sensed skew.

2. An arrangement in accordance with claim 1, wherein the means for changing the nominal length comprises means for increasing the nominal length of the following gap by an amount equal to one half the value of the sensed skew.

3. An arrangement in accordance with claim 1, wherein the means for changing the nominal length comprises means for decreasing the nominal length of the following gap by an amount equal to one half the value of the sensed skew.

4. In an arrangement in which different ones of a plurality of pairs of transducing elements are selectively employed to perform read or write operations by simultaneously addressing a common pair of informational tracks which undergo motion relative to the transducing elements, an arrangement for compensating for skew which may occur between the individual tracks of the common pair such that one track is presented early and the other track is presented late relative to a given pair of the transducing elements, comprising:
   - means coupled to the given pair of transducing elements for measuring skew between the individual tracks;
   - means responsive to the skew measuring means for computing one half the measured skew;
   - means coupled to the given pair of transducing elements and responsive to the termination of a deskew interval within the early track and to the computing means for commencing measurement of an interval of length equal to a nominal value plus one half the measured skew along the track; and means associated with the measurement commencing means and responsive to the end of the measured interval for simultaneously initiating a read or write operation in both tracks.

5. An arrangement in accordance with claim 4, wherein the means for measuring skew between the individual tracks comprises counter means, means responsive to the occurrence of a reference gap in the early track at the associated transducing element for initiating a count within the counter means and means responsive to the occurrence of a reference gap in the late track at the associated transducing element for terminating the count within the counter means, the count within the counter means comprising the measured skew.

6. A data storage system having increased storage capacity and incorporating a succession of fields extending along adjacent portions of parallel tracks of a record member and separated by gaps of nominal clock count value and a plurality of transducer elements associated with different ones of the parallel tracks, the relative locations of the transducer elements along the length of the parallel tracks being known only within predetermined tolerances, comprising:

means coupled to the transducer elements for measuring skew between the adjacent portions of parallel tracks comprising at least some of the fields;

means responsive to a selected fixed occurrence at the end of each field for starting clock count of the following gap; and means responsive to the measured skew for adjusting the value of the gap clock count by an amount equal to one half of the skew.

7. The invention defined in claim 6 above, wherein each field comprises adjacent portions of two parallel tracks and the means for measuring skew is coupled to a pair of the transducer elements, each of which is associated with a different one of the two parallel tracks.

8. The invention defined in claim 7 above, wherein two different pairs of the transducer elements are associated with the two parallel tracks and the skew between adjacent parallel track portions corresponds to the difference in orientation of the two different pairs of transducer elements.

9. A cyclic recording system for packing records of known length along parallel tracks of a cyclically driven record member with improved efficiency in data storage where a nominal record gap must be observed despite use of separate transducers along tracks that may be arbitrarily selected for read or write, said records including reference portions containing record gaps of selected nominal length, comprising:

means including counter means responsive to movement of the record member for providing record gaps of the selected nominal size during writing;

a pair of transducer means coupled to read from and record on paired tracks on the record member and responsive to said means for providing record gaps;

detector means coupled to each of the transducer means and responsive to signals therefrom for sensing the relative displacement of each record on a time base;

counter means coupled to said detector means for generating a count corresponding to the relative skew between the records on the paired tracks; and means responsive to said counter means and coupled to control said means providing record gaps for changing the selected nominal size of the gaps by one half the actual skew before reading or writing.

10. A system for the storage and retrieval of digital information comprising:

a rotatable magnetic disk having a plurality of circular tracks disposed thereon, each adjacent pair of the tracks defining a succession of variable fields separated by gaps of nominal length;

a plurality of groups of magnetic transducing heads, each group being generally disposed along a different common radius of the disk with each head thereof being in transducing relation to a different one of the tracks;

central processing means for presenting digital information to be written on the disk and receiving digital information read from the disk and operative to provide command signals indicating operations to be performed on the disk;

head select means responsive to the command signals from the central processing means and to the disk for selecting a pair of the heads from the head group closest to an field on the disk to be addressed; and means coupled between the central processing means and the pair of heads selected by the head select means for transferring digital information between the central processing means and the selected pair of heads during read and write operations in response to the command signals and including means for correcting skew between the tracks associated with the selected pair of heads, the skew correcting means including means for measuring the skew present at a given field, and means responsive to the measured skew for adjusting the nominal length of a gap immediately following the given field by an amount equal to one half the nominal skew.

11. A system in accordance with claim 10, wherein the means for transferring digital information includes first and second channels coupled between the central processing means and a different one of the selected pair of heads, each of the first and second channels including oscillator means operative to selectively lock to digital information read by the associated head for passing the information to the central processing means, and write driver means operative to pass digital information from the central processing means to the associated head for writing on the associated disk track when turned on, and wherein the means for adjusting the nominal length of a gap comprises means responsive to a fixed occurrence at the beginning of the immediately following gap for counting to a value equal to the nominal length of the gap as adjusted by one half the measured skew, and means responsive to the end of the count for locking the oscillator means in the first and second channels to the digital information in the case of a following read operation and for turning on the write driver means in the first and second channels in the case of a following write operation.

12. A system in accordance with claim 11, wherein each field includes a sync gap within each of the two adjacent tracks, and wherein the means for measuring the skew comprises separate means within each of the first and second channels for detecting the occurrence of a sync gap therein, and counter means coupled to each of the sync gap detecting means and operative to count the time difference between occurrence of sync gaps in the first and second channels, the time difference count representing the measured skew.

13. A system in accordance with claim 12, wherein each of the first and second channels includes bit ring means coupled to cycle in response to each bit of digital information in the channel, and wherein the counter means is coupled to count cycles of the bit ring means between occurrence of sync gaps in the first and second channels.

14. A system in accordance with claim 13, further including separate buffer means within each of the first and second channels for temporarily storing digital information from the associated head, and buffer control means coupled to the buffer means in the first and second channels and responsive to the storage of a predetermined number of bits of the digital information in either buffer means for sequentially passing the corresponding bits of each channel to the central processing means.

* * * * *